(12) United States Patent
Procter

(10) Patent No.: US 6,484,949 B2
(45) Date of Patent: Nov. 26, 2002

(54) FLUID FLOW CONTROL

(75) Inventor: Frank Procter, Staffordshire (GB)

(73) Assignee: Bristan Limited (GB)

( * ) Notice: Subject to any disclaimer, the term of this patent is extended or adjusted under 35 U.S.C. 154(b) by 0 days.

(21) Appl. No.: 09/957,910

(22) Filed: Sep. 21, 2001

(65) Prior Publication Data

US 2002/0011523 A1 Jan. 31, 2002

Related U.S. Application Data

(63) Continuation-in-part of application No. 09/285,278, filed on Apr. 2, 1999, now abandoned.

(30) Foreign Application Priority Data

Apr. 4, 1998 (GB) ............................................. 9807235
Aug. 10, 1999 (GB) ............................................. 9817212

(51) Int. Cl.$^7$ ............................................. G05D 23/13
(52) U.S. Cl. ................ 236/12.2; 137/625.4; 137/454.2
(58) Field of Search ........................... 236/12.2, 93 B; 137/625.4, 625.41, 454.2, 454.5, 454.6

(56) References Cited

U.S. PATENT DOCUMENTS

| | | | | |
|---|---|---|---|---|
| 4,331,176 A | * | 5/1982 | Parkison .................. | 137/454.5 |
| 4,397,330 A | * | 8/1983 | Hayman ..................... | 137/270 |
| 4,651,770 A | * | 3/1987 | Denham et al. ............ | 137/270 |
| 4,901,749 A | * | 2/1990 | Hutto ......................... | 137/270 |
| 5,014,736 A | * | 5/1991 | Korfgen et al. .......... | 137/315.13 |
| 5,054,514 A | * | 10/1991 | Valdes Marin ........... | 137/454.2 |
| 5,344,067 A | * | 9/1994 | Axelsson et al. .......... | 236/12.2 |
| 5,370,305 A | * | 12/1994 | Schneider .................. | 236/12.2 |
| 5,535,943 A | * | 7/1996 | Kahle et al. ............... | 236/12.2 |
| 5,853,023 A | * | 12/1998 | Orlandi et al. ............. | 137/271 |
| 5,934,552 A | * | 8/1999 | Kalbacher et al. ......... | 236/12.2 |

FOREIGN PATENT DOCUMENTS

GB 2253680 * 9/1992 ................ 236/12.2

* cited by examiner

*Primary Examiner*—William E. Tapolcai
(74) *Attorney, Agent, or Firm*—Welsh & Katz, Ltd.; Thomas W. Tolpin

(57) ABSTRACT

A dual control assembly for a shower fitting comprising a thermostatic valve in the form of a cartridge removably fitted in the mixing chamber of the fitting, and a flow rate valve, the two valves being operatively linked or coupled together, for example by a sleeve. The valves are co-axially aligned and provided with respective control knobs which are disposed at the same end of the shower fitting.

18 Claims, 7 Drawing Sheets

FLUID FLOW CONTROL

BACKGROUND OF THE INVENTION

This invention relates to improvements in or relating to fluid flow control and is more particularly concerned with a dual control assembly, for example for a shower fitting or other water outlet, where the temperature of water can be controlled by a thermostatic valve and the water flow by a flow rate valve.

Where dual controls have been provided in, for example, shower fittings, the temperature of the water may be controlled by means of a thermostatic valve governing the mix of hot and cold water flowing into the mixing chamber and the rate at which mixed water flows out of the mixing chamber through the shower head may be independently controlled by means of a flow rate valve. A disadvantage of such controls is that if a fault develops in the thermostatic valve, repair and/or service costs resulting from the need to dismantle or remove the shower body often have to be paid by the end user. In order to overcome this disadvantage with most traditional showers, it is known to provide the thermostatic valve as a cartridge or unit that can be inserted into the mixing chamber and reasonably easily extracted therefrom for instant repair and servicing or replacement, without it being necessary to dismantle or remove the shower body at all. Such cartridges/units are readily available. When such a cartridge is incorporated into a water outlet, it is known for the cartridge to be introduced into a mixing chamber from one end of the water outlet fitting, with an appropriate temperature control knob being provided at that end, and a separate flow rate valve (in the form of a ceramic disc ("CD") valve) being incorporated at the other end of the fitting with an appropriate independently operable control knob at that end for controlling the flow rate. Such a design is employed on the European Continent but is not generally suitable for the United Kingdom or the United States of America owing to the orientation usually accepted or required, where the thermostatic valve control knob projects forwardly and horizontally from the wall (rater than parallel therewith) and is rotatable about an axis extending at right angles thereto. In such a design, a flow control knob positioned in line with the thermostatic valve control knob at an opposite end of the fitting would have the flow control knob facing the wall and thus could not be accessed properly.

It is known, however, to provide dual control assemblies for showers meeting British design requirements where the thermostatic valve is in the form of a cartridge or unit insertable in a mixing chamber which projects forwardly and horizontally from a wall on which the fitting is mounted. However, in order for the flow rate to be controlled a separate independently operable control knob is mounted above the thermostatic control knob and above the mixing chamber in order to control a separate flow rate valve. It is believed that such a design is disadvantageous in certain respects. For example, it is believed that said design is not as aesthetically pleasing as a design in which the thermostatic control knob and flow rate control knob are mounted in line with one another or concentrically and, preferably, operable from the same end of the mixing chamber as may be provided for where the thermostatic valve is not in the form of an insertable/extractable replacement unit or cartridge. Additionally, such a design may be disadvantageous from a cost or manufacturing point of view. In any event, it is believed that a design of dual control assembly has not been optimised more particularly for the British or American Market which includes a thermostatic valve in the form of an insertable/extractable cartridge or unit.

It is an object of the present invention to at least alleviate one or more of the aforementioned disadvantages with dual control assemblies and/or to provide a dual control assembly which is improved in at least some respect.

BRIEF SUMMARY OF THE INVENTION

According to the present invention there is provided a dual control assembly comprising a thermostatic valve in the form of cartridge or unit insertable in a mixing chamber of, for example, a shower fitting or other water outlet, said assembly having an operative link or coupling between the thermostatic valve and a flow rate valve.

In one embodiment of the present invention, the operative link or coupling between the thermostatic valve and the flow rate valve is provided by a sleeve surrounding the thermostatic valve which sleeve is operatively connected to the flow rate valve. The flow rate valve is, preferably, co-axially aligned with the thermostatic valve with said sleeve being arranged to turn the body of the flow rate valve relative to an operating stem of said valve, which stem is held still relative to a mixing chamber of the shower fitting or water outlet. The sleeve (or other operative link or coupling) may or may not be part of the cartridge or unit and may or may not be arranged to rotate with the thermostatic valve to operate the flow rate valve.

Preferably, the dual control assembly is provided with a control knob that actuates the thermostatic valve, co-axially arranged with a second control knob that operates the flow rate valve, said two control knobs being provided at the same end of said shower fitting or other water outlet. The first control knob may be mounted on control stem of the thermostatic valve with said second control knob mounted on a (splined) portion of the cartridge/unit being integral with the body thereof. The cartridge/unit may be of a readily available standard form or may be adapted or modified to suit. Where the cartridge/unit is of a standard form the second control knob may be mounted on the splined portion of the cartridge normally utilised for locating a plastics collar of the thermostat control knob.

In another embodiment of the present invention, the operative link or coupling between the thermostatic valve and the flow rate valve is provided by a sleeve surrounding the flow rate valve which sleeve is operatively connected to the thermostatic valve. The thermostatic valve is, preferably, co-axially aligned with the flow rate valve with said sleeve being arranged to turn the body of the thermostatic valve relative to an operating stem of said valve, which stem is held still relative to a mixing chamber of the shower fitting or water outlet. The sleeve (or other operative link or coupling) may or may not be part of the cartridge/unit, or flow rate valve and may or may not be arranged to rotate with the flow rate valve to operate the thermostatic valve.

Preferably, the dual control assembly is provided with a control knob that actuates the thermostatic valve, co-axially arranged with a second control knob that operates the flow rate valve, said two control knobs being provided at the same end of said shower fitting or other water outlet. The first control knob may be mounted on a control stem of the flow rate valve with said second control knob mounted on a (splined) portion of the flow rate valve being integral with the body thereof. The flow rate valve may be of a readily available standard form or may be adapted or modified to suit.

In either of the two above described embodiments the thermostatic valve may be a shuttle valve and/or the flow rate valve may be a disc valve, preferably a C.D. valve.

Further according to the present invention there is provided a shower fitting or other water outlet including a mixing chamber in which can be mounted a thermostatic valve in the form of a cartridge or unit, said fitting or water outlet having a flow rate valve operatively linked or coupled with the thermostatic valve, the thermostatic valve, preferably, being controlled by a control knob mounted coaxially with a control knob for the flow rate valve and said two control knobs, preferably, being mounted at the same end of the fitting or water outlet. Usually, when the shower fitting or water outlet has been installed the thermostatic cartridge will extend forwardly of a vertical wall on which said fitting or outlet is mounted in a generally horizontal plane.

Further according to the present invention there is provided the combination of a thermostatic valve comprising a cartridge or unit insertable into a mixing chamber of, for example, a shower fitting or other water outlet, and means which, in use, forms an operative link or coupling between the thermostatic valve and a flow rate valve of said fitting or other water outlet.

Further according to the present invention, there is provided a dual control assembly comprising a thermostatic valve and a flow rate valve including an operating stem and a body portion, the arrangement being such that the body of the flow rate valve can be rotated relative to said stem to open and close the flow rate valve.

Further according to the present invention there is provided a method of controlling temperature and flow of a liquid medium in, for example, a shower fitting or other fluid outlet, said method comprising setting the temperature of the medium by means of a control knob located at one end of a thermostatic valve in the form of a cartridge or unit and varying the flow rate by means of a second control knob arranged concentrically with the first at the same end of the fitting/fluid outlet.

Still further according to the present invention there is provided a dual control assembly having one or more of the following features:

(a) a thermostatic valve in the form of a cartridge or unit mounted in line with a flow rate disc valve, preferably a CD valve, the body of which may be rotated relative to an operating stem held fixed, in use, relative to a mixing chamber of a shower fitting or other water outlet in which the dual control assembly is mounted;

(b) a thermostatic valve in the form of a cartridge or unit with two concentrically mounted control knobs, the one control knob being for controlling the thermostatic valve and the other control knob being for controlling the flow rate valve preferably operatively coupled to the thermostatic valve, and (c) a thermostatic valve (in the form of a cartridge) aligned with a flow rate valve in a fluid mixing chamber of a fitting or water outlet, the thermostatic valve and flow rate valve being controlled from the same end of the fitting or outlet by co-axially arranged control knobs.

BRIEF DESCRIPTION OF THE DRAWINGS

Embodiments of a dual control assembly for a shower fitting in accordance with the present invention will now be described, by way of example only, with reference to the accompanying drawings in which:

FIG. 2a shows an end view of the CD valve looking in the direction of arrow A in FIG. 2a;

DETAILED DESCRIPTION OF THE INVENTION

Figure 1:
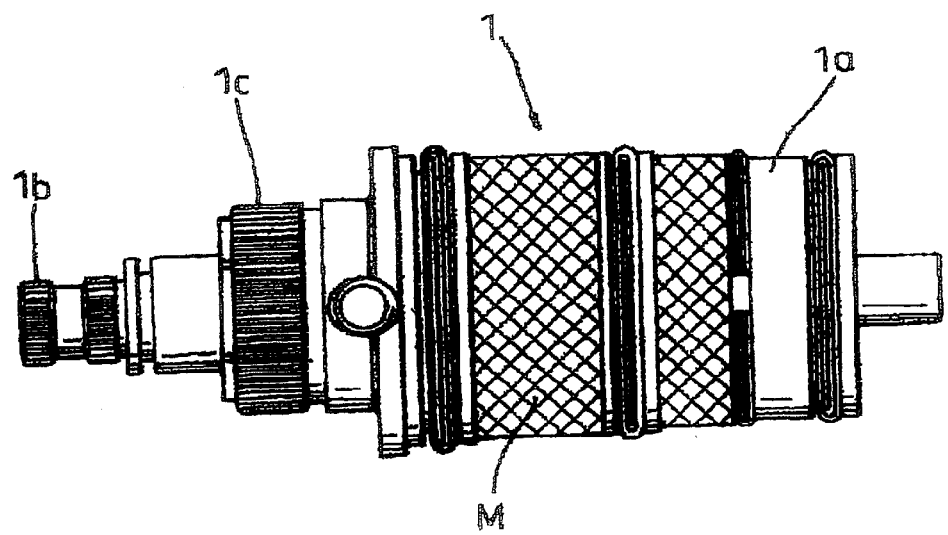
FIG. 1 shows a side view of a known thermostatic valve in the form of a cartridge or unit to be incorporated in a dual control assembly in accordance with the present invention.

The following is a detailed description and explanation of the preferred embodiments of the invention.

In the drawings the same reference numerals are used to designate similar parts.

FIG. 1 shows a known type of thermostatic valve 1 in the form of a cartridge or unit that can be inserted into a mixing chamber of a water outlet fitting such as a shower fitting, which cartridge 1 can be readily easily extracted therefrom should a fault arise with the valve or if there is a need for a service. A service may be recommended to take place annually. The cartridge 1 is known per se and commercially available as an off-the-shelf product and the use of such a cartridge is seen as a significant advantage over more traditional showers that might require the whole shower body to be dismantled or removed in the event of a fault developing with the thermostatic valve. It is known to incorporate such a cartridge in British style shower fittings; the cartridge is mounted at right angles to the wall in a mixing chamber necessitating a separate variable flow rate valve control being mounted above the mixing chamber and above the control knob operating the thermostatic valve. In such an arrangement, therefore, separate controls are provided to vary the temperature (thermostatic valve) and to vary the flow rate (flow rate valve), said controls being entirely independent from one another and mounted in a generally non-compact way which usually is not seen as being neat, convenient or aesthetically desirable. On the other hand, where such a cartridge or unit has been used on the European Continent it has been provided at one end of a mixing chamber with a variable flow rate valve (CD valve) and appropriate independent control being mounted at the other end of the chamber, the cartridge and associated control knob being mounted in line or co-axial with the flow rate valve and its associated control knob at the other end of the fitting. Thus, in such an arrangement, the cartridge 1 is arranged with its axis parallel to the wall an din a horizontal plane which thereby allows the thermostatic valve control knob and the flow rate control valve to be mounted more neatly in line with one another, the control knobs still being operable independently of one another from a respective end of the fitting. Such an arrangement is generally not acceptable for the British and American markets as previously explained in the introductory part of this Patent Specification.

The cartridge 1 has a brass body 1a and a splined stem 1b of reduced diameter which is rotatable through about 330° in a particular direction to either open or close the shuttle valve contained therein.

The cartridge 1 has a wire mesh M, and a splined portion 1e (of wider diameter than stem 1b) integral with the brass body 1a relative to which the splined stem 1b can be rotated. In prior art arrangements, the splined portion 1c acts to fixedly locate a plastics collar (not shown) introduced over the splined portion and on which is mounted the thermostatic valve temperature control knob (not shown) said control knob being marked with degree settings and rotatable with the stem 1b relative to the plastics collar mounted on the splined portion 1c.

Figure 3:
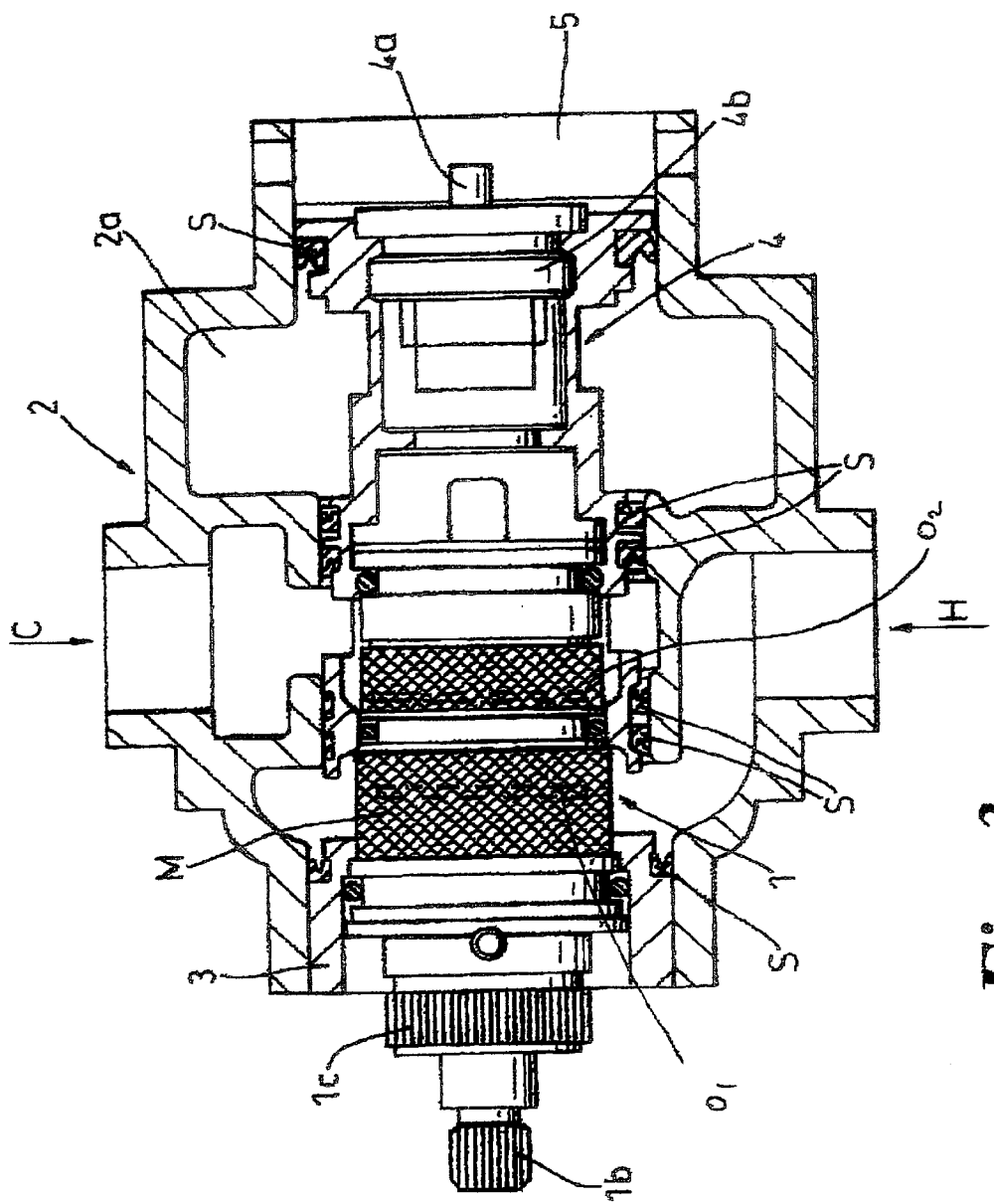
FIG. 3 shows a simplified schematic view of a cartridge similar to that shown in FIG. 1 incorporated in a sleeve in accordance with the present invention that is inserted into the mixing chamber of a dual control assembly and which also includes a flow rate valve being a CD valve similar to that shown in FIG. 2.

The present invention is concerned with utilising a generally known form of thermostatic valve cartridge or unit such as that shown in FIG. 1 in a new way in a water outlet mixing chamber which is represented schematically in section in FIG. 3 and indicated by the reference numeral 2. Once again the mixing chamber 2 is generally of a known form and will not be described in further detail.

FIG. 3 shows, in a simplified way, how, in accordance with this embodiment of the present invention, a thermostatic valve cartridge 1 (corresponding generally to cartridge 1 shown in FIG. 1) has been incorporated into a sleeve 3 which has in turn been introduced into the mixing chamber 2 from the left hand end of the fitting as shown in FIG. 3. Prior to the insertion of the sleeve 3 and cartridge 1 into the mixing chamber 2 a flow rate control valve 4 (CD valve) has been already introduced into the mixing chamber with a splined stem 4a being seated in a matching circular recess in base portion 5 at the right hand end of the mixing chamber in such a manner that the stem 4a is gripped and prevented from rotating relative to the base 5 and mixing chamber 2.

In the mixing chamber 2 as shown in FIG. 3, hot water enters the mixing chamber through the bottom opening in the direction of the arrow H and cold water flows into the mixing chamber from above in the direction of arrow C (or vice versa if preferred). The rotation of thermostatic valve stem 1b operates the shuttle valve SV (see FIG. 4) in the cartridge 1 and thereby governs the mix of hot and cold water flowing through respective, circumferential slot openings $O_1$ and $O_2$ inside the mesh M of the cartridge 1 into the body of the shuttle valve in known manner. The cartridge has two equiangularly spaced slot openings $O_1$ (one shown in in dashed lines in FIG. 3) and two equiangularly spaced slot openings $O_2$ (one shown in dashed lines in FIG. 3). Water flows axially inside the cartridge 1 from the shuttle valve SV in the cartridge 1 to the CD valve 4 and the angular rotation of the sleeve 3 and body 4b relative to stem 4a varies the flow rate possible through the CD valve into the chamber 2a of the mixing chamber 2 which leads to the shower head (not shown) of the shower fitting.

Figure 2:
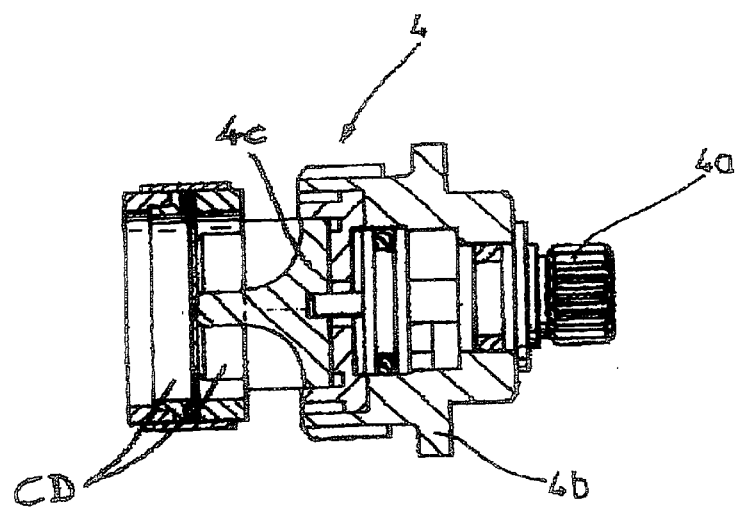
FIG. 2 shows a sectional view through a known type of CD valve (which is a self-contained unit) to be incorporated in a dual control assembly in accordance with the invention.
Figure 2A:
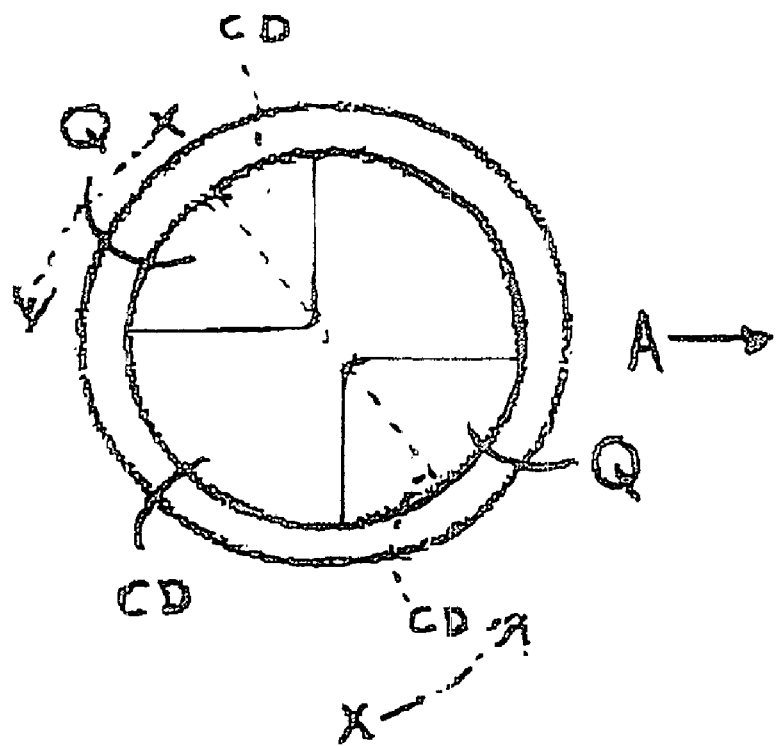

A more detailed view of a flow rate CD valve 4 is shown in section in FIG. 2, this CD valve 4 only differing slightly from the CD valve 4 shown in FIG. 3, for example by the slightly wider diameter splined head 4a. The CD valve 4 in both cases comprises two co-axial ceramic discs CD formed with opposed quadrant holes, one of the discs being connected to the splined stem 4a by an intermediate part 4c and being held fixed by the stem relative to base portion 5 when mounted in the assembly. The other CD disc is arranged to be rotatable with the sleeve 3 so that the quadrant holes in that disc move into and out of registration with the holes in the fixed disc to thereby control the flow of water through the holes into the chamber 2a and to the shower head.

One disc CD (the stationary disc connected to stem 4a) is shown in FIG. 2 in solid lines. The dashed lines represent a position of part registration only of quadrant holes Q in the other disc CD. The dashed arrows X represent the direction of rotation of the turnable disc to close off registration.

Simultaneously as the quadrant holes Q in the turnable disc move into and out of registration with the quadrant holes Q in the other disc, the quandrant holes in the turnable disc move into an dout of registration with the circumferential side apertures CA (see FIG. 5a) in the body of the CD valve 4 allowing water to pass axially through the circumferential apertures CA into chamber 2a.

As is very well known, in normal operation, the CD valve 4 is utilised in a water outlet fitting with the splined stem 4a being rotated relative to the valve body 4b by a flow rate control valve knob (not shown), said body 4b being held still relative to the water outlet.

The sleeve 3 forms a very important part of the present invention and acts as an operative link r coupling between the thermostatic valve cartridge 1 and the CD valve 4. In use, the sleeve 3 being mounted in the mixing chamber 2 by various rotary seals S forms an operating link or coupling between said valve 1 and the flow rate valve 4. The arrangement is such that on rotation of the sleeve 3 about its axis said sleeve, being positively coupled to the body 4b of the CD valve, acts to open and close the CD valve by rotating said body relative to the stem 4a which is held fixed relative to base portion 5 and mixing chamber 2 as previously explained.

Rotation of the sleeve 3 relative to the mixing chamber 2 can be effected by rotating the cartridge 1 with the sleeve 3 by means of a control knob (not shown in FIG. 3) mounted on wider diameter splined portion 1c of cartridge 1. A second control knob (not shown) is mounted on the splined stem 1b, the rotation of which opens and closes the shuttle valve contained within the thermostatic valve cartridge 1.

In an alternative embodiment, it is possible that the sleeve 3 could be arranged to rotate relative to the cartridge 1 and mixing chamber 2 in order to rotate the body of the CD valve 4. In such an embodiment a plastics collar could be fixedly located on splined portion 1c with the sleeve being mounted on, and rotatable relative thereto.

Figure 4:
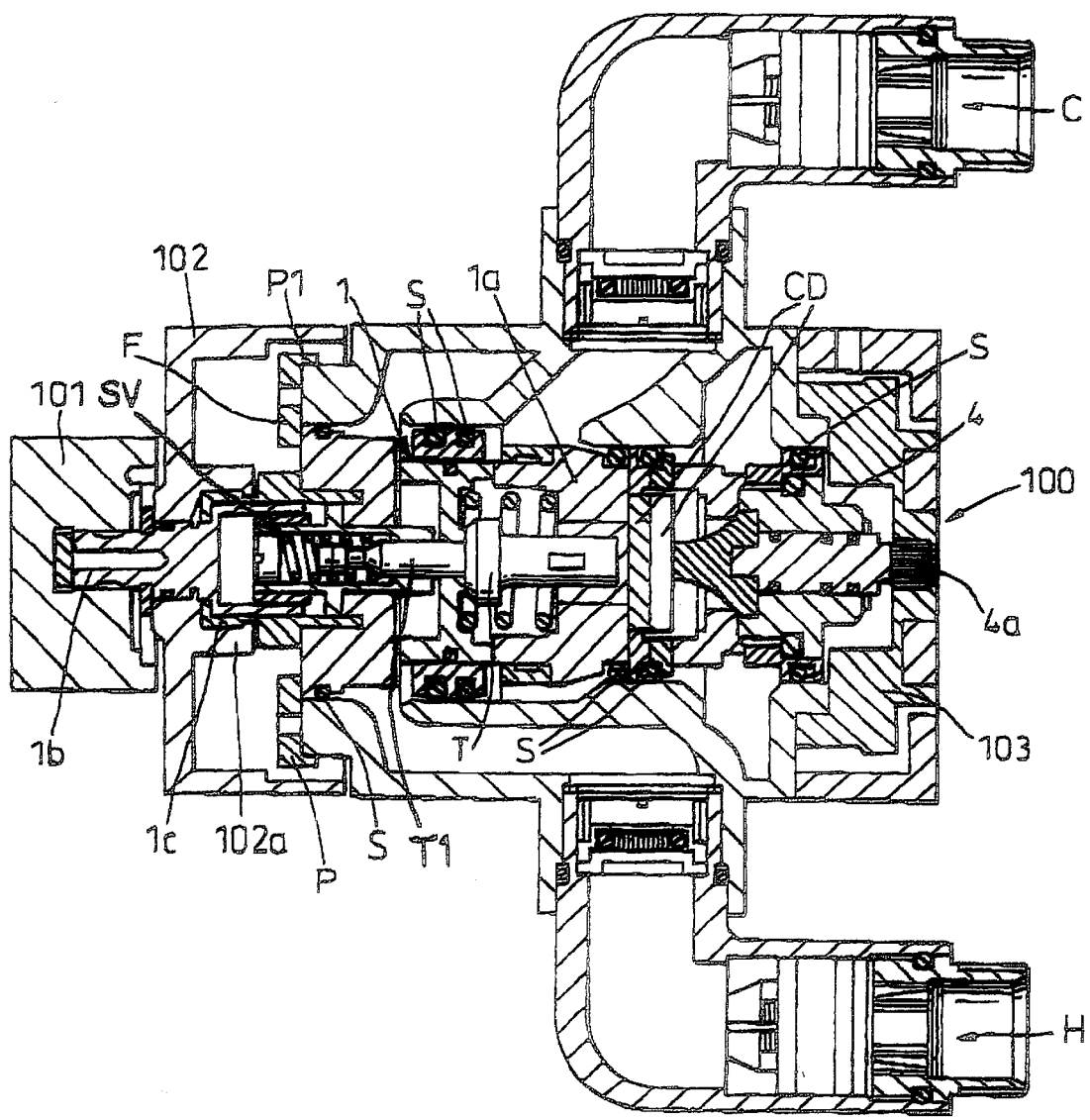
FIG. 4 shows a more detailed part-sectional view through a shower fitting in accordance with the present invention.

FIG. 4 shows a more detailed view through a shower fitting 100 including the cartridge 1. This cartridge may be mounted into a sleeve.

FIG. 4 shows a first control knob 101 mounted on splined stem 1b of cartridge 1 as shown in FIG. 1. The control knob 101 is rotatable with the stem 1b relative to wider diameter splined portion 1c and control knob 102, which has an internal collar 102a gripping said wider diameter splined portion 1c. Control knob 101 may be operated by a radially protecting handle and control knob 102 may be operated by an angled handle. It is to be appreciated that various forms and shapes may be chosen for the control knobs 101 and 102 with handle means to suit.

FIG. 4 shows a further detail of the cartridge 1, namely a temperature responsive wax capsule T arranged to expand and contract to operate the thermostatic valve, and a further detail of the flow control valve, namely the ceramic discs CD. The valve stem 1b of the thermostatic valve is operatively connected to the shuttle valve SV so that turning of the stem sets the valve to the appropriate position or the required temperature. The capsule T is arranged to move a stem T1 axially as it expands and contracts in response to changes in the temperature of the incoming water, and the stem T1 adjusts the setting of the shuttle valve to maintain the required temperature.

Plate P is a retaining plate that is screwed onto the fitting 100 by means of screws (not shown) each of which locates in an associated hole or slot in the plate. The plate P radially overlaps the cartridge 1 thereby retaining the cartridge 1 securely in the fitting 100. Circumferential flange P1 of plate P overlaps and securely and snugly seats on a stepped portion of the fitting. Radially inward directed semi-circular flange F overlaps the widest diameter rim portion of the cartridge 1 preventing removal of the cartridge 1 from the fitting 100 until plate P is removed by unscrewing the screws.

CD valve 4 has splined stem 4a seated in base portion 103. Base portion 103 is screwed tightly into the fitting 100 by means of screws (not shown). The sleeve may be secured to the cartridge 1 by means of a screw (not shown) screwed through a hole in the sleeve into a hole in the cartridge 1. The sleeve may be coupled to the body of the CD valve 4 by any suitable means for example by a screw thread fixing.

In the aforedescribed embodiments of the present invention the cartridge 1 may be readily extracted from the mixing chamber o the fitting 100 by:

1) readily removing the control knobs 101 and 102 (a radial screw may be provided preventing control knob 101 from moving axially off stem 1b until the screw is undone),
2) Unscrewing the screws securing plate P and removing the plate,
3) if appropriate the fastening screw retaining the sleeve to the cartridge 1 then being undone, so that the cartridge can simply be removed from the sleeve and fitting 100.

However, in the alternative embodiment the cartridge and sleeve may be designed as a single replaceable unit that may be easily inserted and extracted from the mixing chamber. The flow rate valve may or may not also be designed as part of the replaceable unit or cartridge.

Several modifications may be possible with regard to the cartridge/sleeve design.

It is generally desirable for the thermostatic valve to have as wide a diameter as possible in order to increase the flow rate there through given the diameter of the fitting involved and one way that this may be achieved is by splitting up the sleeve into separate annular portions. Thus, the sleeve can be replaced by two or three separate annular portions which is less expensive since less material needs to be used.

Figure 5:
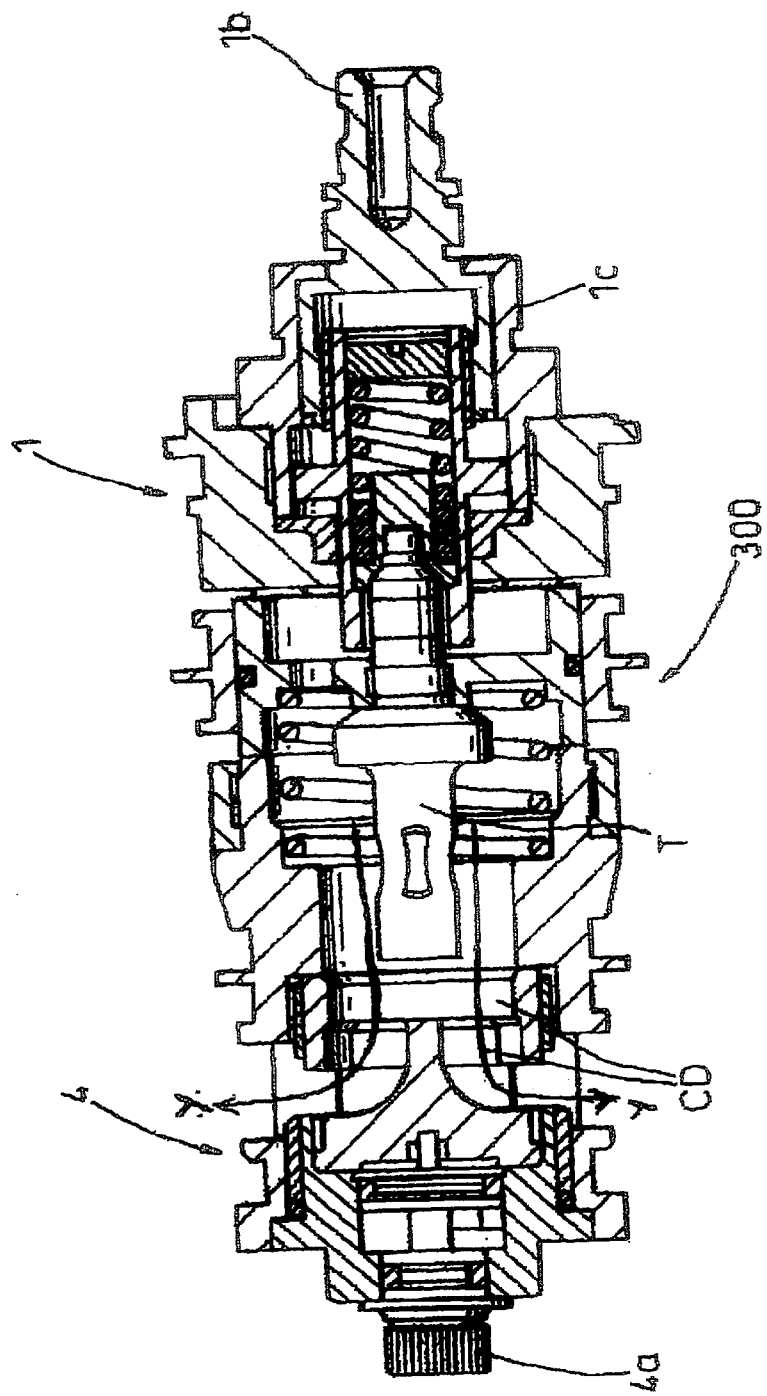
FIG. 5 shows a cross-sectional view through an alternative cartridge designed as a single replacement unit for seals (not shown) to be mounted thereon directly.
Figure 5A:
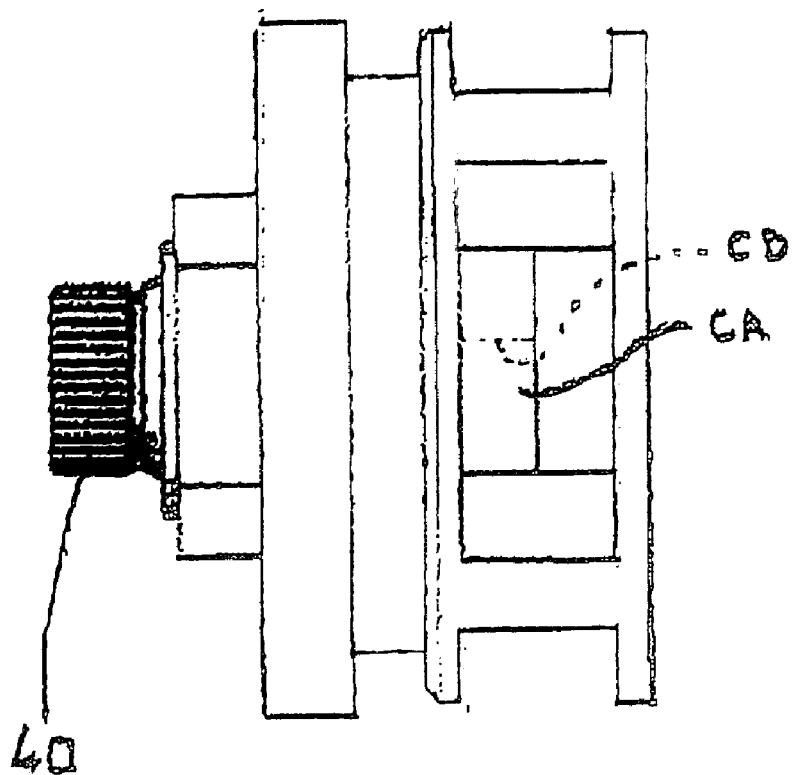
FIG. 5a shows an outside detail of a left portion of an elevational side view of the cartridge.

Depending upon the design of cartridge, the sleeve could be omitted completely by redesigning the outer peripheral surface of the cartridge to take the seals S directly. In this manner, the diameter of the thermostatic valve could be increased by another 3 mm to 5 mm, advantageously increasing the flow rate still further for the same size of mixing chamber orifice. An example of such a wider cartridge 300 (having a wider chamber for the shuttle valve and being a single replacement unit made without separate sleeve/s) is shown in FIG. 5. FIG. 5 shows the direction of water flow (see arrows Y) from the shuttle valve SV through the ceramic discs CD, which flow is applicable to the cartridge shown in FIGS. 3 and 4. FIG. 5a shows a detail of part of the cartridge 300 in side view revealing one of four equiangularly spaced circumferential apertures CA. Clockwise rotation of the cartridge relative to stem 4a closes the aperture CA as the static disc CD (shown in dashed lines) closes the aperture.

Figure 6:
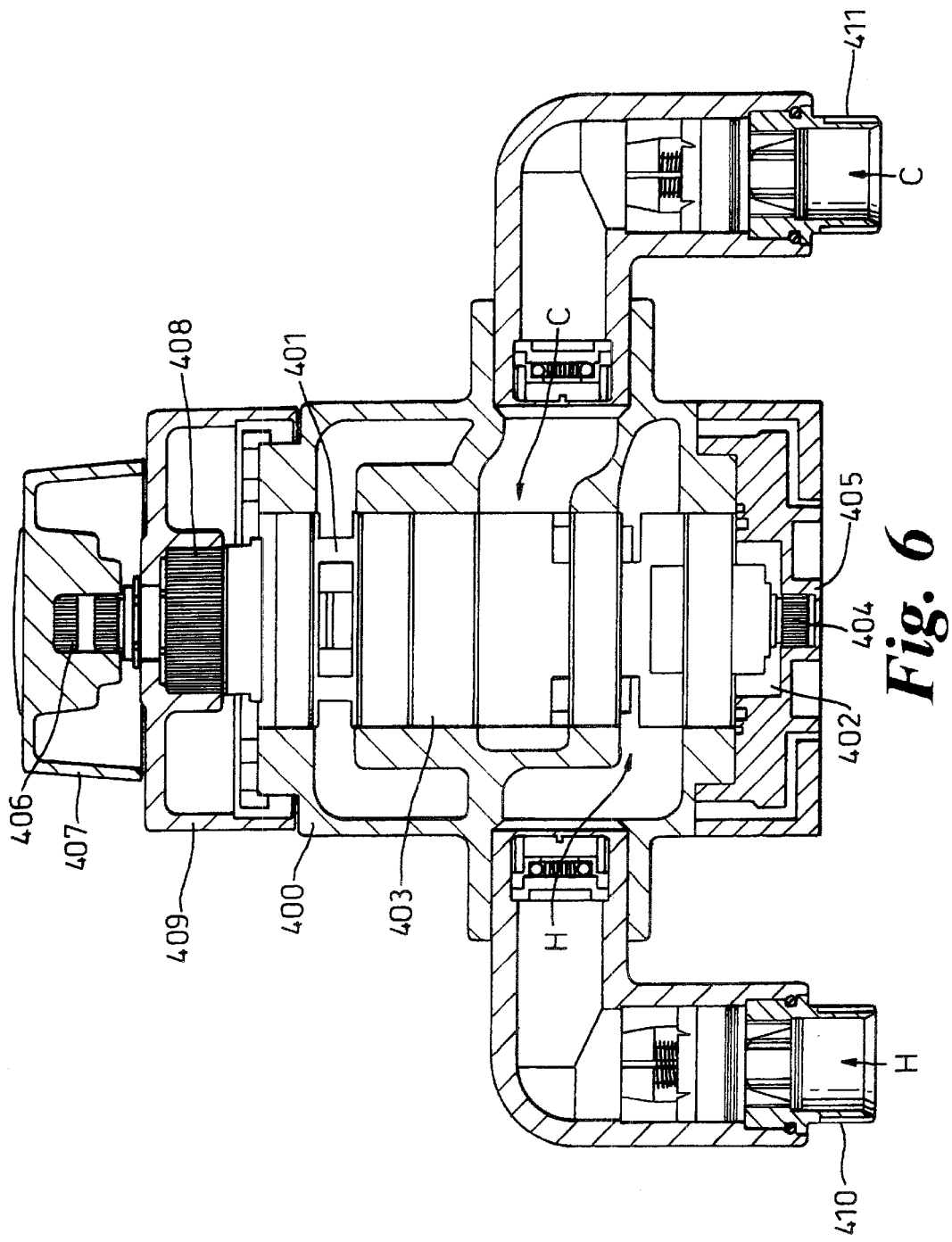
FIG. 6 shows a sectional view through a shower fitting including an alternative embodiment of a flow control assembly according to the invention.

FIG. 6 shows a sectional view through a shower fitting which includes an alternative flow control device. The arrangement is similar to that illustrated in FIG. 3, the fitting including a mixing chamber 400 with a ceramic disc (CD) flow control valve 401 and thermostatic valve cartridge 402. However, the arrangement differs in that the flow control valve cartridge is incorporated into a sleeve 403 and is mounted towards the front of the mixing chamber, toward the controls, and the thermostatic valve cartridge is mounted toward the rear.

The thermostatic valve cartridge 402 includes a splined stem 404 which is seated in a matching circular recess 405 in the rear portion of the mixing chamber 400, in such a manner that the stem 404 is gripped and prevented from rotating relative to the mixing chamber 400.

The body of the thermostatic valve cartridge 402 is also incorporated into sleeve 403. The sleeve 403 operatively connects the thermostatic valve cartridge 402 to the flow control valve 401. The flow control valve 401 includes a control stem 406, connected to inner control 407 and a splined portion 408, integral with the valve body and connected to control 409.

In use, hot water enters the mixing chamber through connection 410, in the direction of arrow H and cold water enters the mixing chamber through connection 411 in the direction of arrow C, (or vice versa if preferred). Water flows into the thermostatic valve cartridge 402. The rotation of the valve stem 404, relative to the valve body governs the mix of hot and cold water. Adjustment is effected by rotation of outer control 409 which causes rotation of the body of the flow control valve 401 and hence the sleeve 403 and body of the thermostatic cartridge valve, relative to the valve stem 404.

Water then flows up the cartridge to the CD flow control valve 401. The rate of flow of water through the CD valve 401 is controlled by rotation of the valve stem 406 relative to the valve body. This may be effected by rotation of the inner control 407, relative to the outer control 409.

In an alternative arrangement the sleeve 403 could be connected directly to the outer control 409.

An advantage of the arrangement illustrated in FIG. 6 is that the sleeve torque and flow control torque are separated. That is, the flow control valve can be operated without rotation of the sleeve. Provided that the temperature is adjusted after the flow control is on, then the sleeve only has to turn against the dynamic flowing pressure, not the full static pressure of the water supply. Thus the torque required to adjust the temperature, or, as would be the case in the arrangement illustrated in FIGS. 3 and 4 the rate of flow is reduced.

It is to be understood that the scope of the present invention is not to be unduly limited by the particular choice of terminology and that a specific term may be replaced or supplemented by an equivalent or generic term. Further it is to be understood that individual features, method or function related to the dual control assembly or coupling arrangement might be individually patentably inventive.

Although embodiments and examples of this invention have been shown and described, it is to be understood that various modifications, substitutions, and rearrangements of structural parts, features and components, as well as other uses thereof, can be made by those skilled in the art without departing from the novel spirit and scope of this invention.

What is claimed is:

1. A dual control assembly comprising a thermostatic valve in the form of a cartridge or unit insertable in a mixing chamber comprising: a shower fitting or other water outlet, a flow rate valve, and an operative link or coupling provided between the thermostatic valve and the flow rate valve, said flow rate valve being a self-contained unit.

2. An assembly as claimed in claim 1 in which the operative link or coupling between the thermostatic valve and the flow rate valve is provided by a sleeve surrounding the thermostatic valve, which sleeve is operatively connected to the flow rate valve.

3. An assembly as claimed in claim 1 in which the flow rate valve is co-axially aligned with the thermostatic valve, said link or coupling being arranged to turn the body of the flow rate valve relative to an operating stem of said valve with said stem held still relative to the mixing chamber of the shower fitting or water outlet.

4. An assembly as claimed in claim 3 in which the sleeve or other operative link or coupling is part of the cartridge or unit and is arranged to rotate with the thermostatic valve to operate the flow rate valve.

5. An assembly as claim in claim 4 which is provided with a control knob that actuates the thermostatic valve, co-axially arranged with a second control knob that operates the flow rate valve, said two control knobs being provided at the same end of said shower fitting or other water outlet.

6. An assembly as claimed in claim 5 in which the first control knob is mounted on a control stem of the thermostatic valve with said second control knob mounted on a portion of the cartridge/unit being integral with body thereof.

7. An assembly as claimed in claim 1 in which the operative link or coupling between the thermostatic valve and the flow rate valve is provided by a sleeve surrounding the flow rate valve which sleeve is operatively connected to the thermostatic valve.

8. A shower fitting or other water outlet including a mixing chamber in which is mounted a thermostatic valve in the form of a cartridge or unit, said fitting or water outlet having a flow rate valve operatively linked or coupled with the thermostatic valve, the thermostatic valve being controlled by a control knob mounted co-axially with a control knob for the flow rate valve and said two control knobs being mounted at the same end of the fitting or water outlet, the flow rate valve being a self-contained unit.

9. A dual control assembly comprising a thermostatic valve and a flow rate valve including an operating stem and a body portion, the arrangement being such that the body of the flow rate valve can be rotated relative to said stem to open and close the flow rate valve, the flow rate valve being a self-contained unit.

10. A dual control assembly, comprising: a thermostatic valve in the form of a cartridge or unit mounted in line with a flow rate disc valve, the body of which may be rotated relative to an operating stem held fixed, in use, relative to a mixing chamber or a shower fitting or other water outlet in which the dual control assembly is mounted, the flow rate valve being a self-contained unit.

11. An assembly as claimed in claim 2 in which the flow rate valve is co-axially aligned with the thermostatic valve, said link or coupling being arranged to turn the body of the flow rate valve relative to an operating stem of said valve with said stem held still relative to the mixing chamber of the shower fitting or water outlet.

12. An assembly as claimed in claim 1 in which the operative link or coupling is part of the cartridge or unit and is arranged to rotate with the thermostatic valve to operate the flow rate valve.

13. An assembly as claimed in claim 1 which is provided with a control knob that actuates the thermostatic valve, co-axially arranged with a second control knob that operates the flow rate valve, said two control knobs being provided at the same end of said shower fitting or other water outlet.

14. A dual control assembly as claimed in claim 1 in which the flow rate valve can be carried as a removable sub-unit on the thermostatic valve cartridge/unit.

15. A dual control assembly as claimed in claim 14 in which the flow rate valve is threadably engageable with the thermostatic cartridge/unit.

16. A shower fitting or other water outlet having controls and including a dual control assembly comprising a thermostatic valve in the form of cartridge or unit insertable in a mixing chamber of the shower fitting or other water outlet, and a flow rate valve, and in which an operative link or coupling is provided between the thermostatic valve and the flow rate valve, the flow rate valve being mounted toward the front of the mixing chamber, towards said controls, and the thermostatic valve being mounted toward the rear.

17. A dual control assembly having a thermostatic valve in the form of a cartridge or unit with two concentrically mounted control knobs, the one control knob being for controlling the thermostatic valve and the other control knob being for controlling the flow rate valve operatively coupled to the thermostatic valve, the flow rate valve being a self-contained unit.

18. A dual control assembly having a thermostatic valve aligned with a flow rate valve in a fluid mixing chamber of a fitting or water outlet, the thermostatic valve and flow rate valve being controlled from the same end of the fitting or outlet by coaxially arranged control knobs, the flow rate valve being a self contained unit.

* * * * *